Dec. 3, 1929.                P. D. ELLIS                1,738,364
                         ATTACHMENT FOR PLOWS
                         Filed Oct. 24, 1928         2 Sheets-Sheet 1
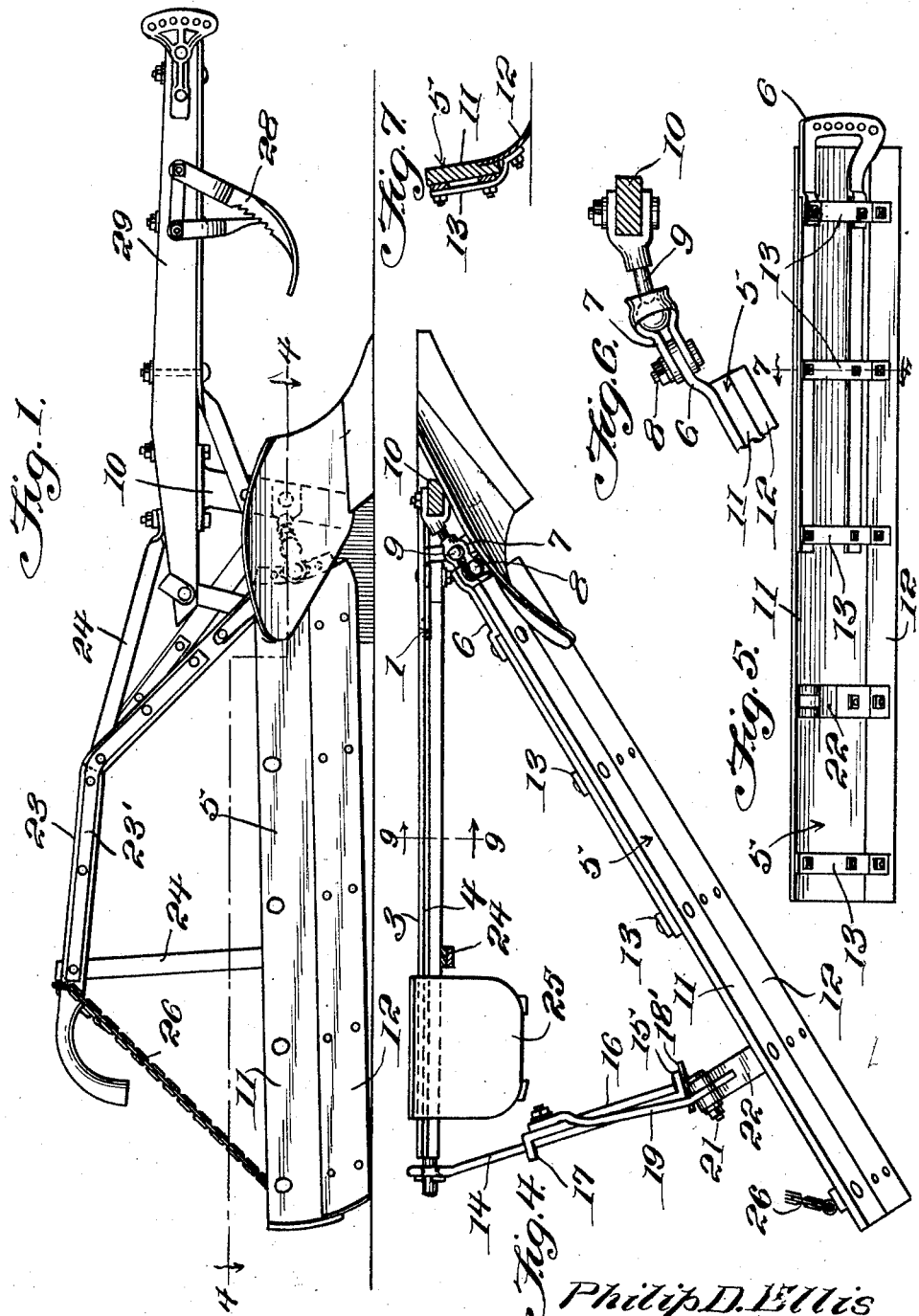
Philip D. Ellis
INVENTOR
BY Victor J. Evans
ATTORNEY
WITNESS: J. T. L. Wright

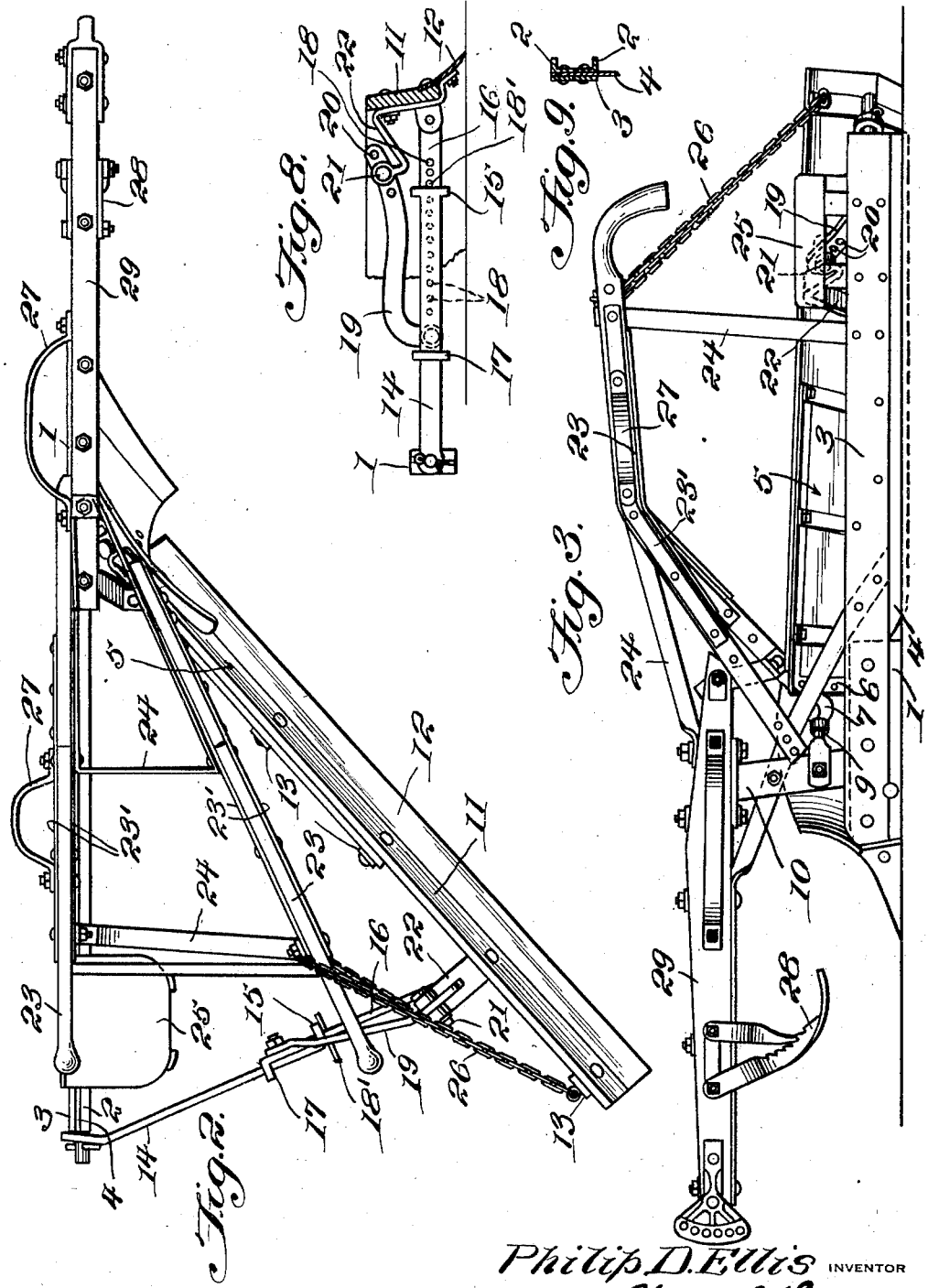

Patented Dec. 3, 1929

1,738,364

UNITED STATES PATENT OFFICE

PHILIP D. ELLIS, OF DUBOIS, IDAHO

ATTACHMENT FOR PLOWS

Application filed October 24, 1928. Serial No. 314,739.

This invention relates to a ditcher or grader plow, the general object of the invention being to provide means for converting an ordinary plow into a grader or ditcher by providing a long landside which is substituted for the ordinary landside plow and a long scraper or dirt remover which forms an extension of the mold board of the plow and which is adjustably secured to the plow so that it can be raised or lowered or tilted to any desired angle and also to provide means for adjusting the scraper toward and away from the landside.

A still further object of the invention is to provide long handles for the plow and a stand on the landside on which the operator can stand when using the device.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a side view of the invention, looking toward the mold board side of the plow.

Figure 2 is a top plan view.

Figure 3 is a side view looking toward the landside.

Figure 4 is a section on line 4—4 of Figure 1.

Figure 5 is a view looking toward the inner face of the scraper.

Figure 6 is a detail sectional view showing the swivel connection between the scraper and the vertical beam of the plow.

Figure 7 is a section on line 7—7 of Figure 5.

Figure 8 is a detail view with parts in section, showing the adjustable connection between the landside and the scraper.

Figure 9 is a section on line 9—9 of Figure 4.

In these views, the numeral 1 indicates a long landside which is substituted for the ordinary landside of the plow, this landside being composed of the pair of angle irons 2 and the plate 3 fastened together by rivets or the like, with a blade 4 between them, this blade extending downwardly beyond the lower edge of the landside so that it will cut into the dirt at the bottom of the furrow and thus prevent the device from slipping. The scraper or dirt remover is shown at 5 and a clevis 6 is fastened to the front end of said scraper. A socket member 7 is fastened to the clevis by the bolt 8 and a ball carrying member 9 is bolted to the vertical beam 10 of the plow with its ball part engaging the socket in the member 7. Thus the scraper is swiveled to the beam of the plow and the clevis provides means for adjusting the scraper vertically. This scraper is composed of the elongated supporting plate 11, to the lower edge of which the curved blade 12 is detachably connected and straps 13 are bolted to the plate 11 and blade 12 and act as reinforcing means for the scraper.

A bar 14 is pivoted to the rear end of the landside and has a loop 15 at its free end. A bar 16 is pivotally connected with the rear part of the scraper and passes through the loop 15 and has a loop 17 at its free end through which the bar 14 passes so that the two bars are slidably connected together, thus enabling the scraper to be moved toward and away from the landside. The bar 16 is provided with a row of holes 18, any one of which is adapted to receive a pin 18' which holds the bars in adjusted position.

A curved arm 19 is carried by the bar 16 adjacent its free end and the free end of this arm is provided with a row of holes 20, any one of which is adapted to receive a pin 21 carried by a bracket 22 fastened to the inner face of the scraper, thus providing means for tilting the scraper to any desired position. A pair of long handles 23 is fastened to the plow, these handles being reinforced by the straps 23' and braces 24 are provided for said handles. A small platform 25 is attached to the rear part of the landside so that an operator can stand thereon and grasp the handles. A chain 26 is fastened to the rear part of the scraper and is adapted to be looped over a part of the handle arrangement so that the scraper can be raised or lowered to control the depth of the cut.

Runners 27 are attached to the left handle and the left side of the beam, so that the plow can be moved from place to place in inoperative position by turning it upon its side and an adjustable depth regulator 28 is fastened to the front part of the beam 29 of the plow.

As will be seen, the scraper or dirt remover has its front end extending in rear of the mold board of the plow so that it will act to push the dirt leaving the mold board well beyond the furrow made by the plow and that said scraper can be adjusted vertically as well as tilted to any desired angle and it can also be adjusted toward and away from the landside. Thus the device can be adjusted to make trenches of different depths and widths. The cutting parts can be easily and quickly removed for sharpening purposes.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A device of the class described comprising a plow, a long landside substituted for the ordinary landside, a scraper, means for swiveling the front end of the scraper to the vertical beam of the plow, with the front end of the scraper overlapping the rear part of the mold board of the plow, means whereby the scraper can be adjusted toward and away from the landside, long handles connected with the plow, a platform connected with the landside below the rear ends of the handles and a runner on the outer face of the landside.

2. A device of the class described comprising a plow, a long landside substituted for the ordinary landside, a scraper, means for swiveling the front end of the scraper to the vertical beam of the plow, with the front end of the scraper overlapping the rear part of the mold board of the plow, means whereby the scraper can be adjusted toward and away from the landside, long handles connected with the plow, means for adjustably connecting the front end of the scraper with the swivel means whereby the scraper can be adjusted vertically and flexible means adjustably connecting the rear of the scraper with a handle.

3. A device of the class described comprising a plow comprising a long landside, a blade depending from the lower edge of the landside, a scraper, a clevis at its front end, swivel means for connecting the clevis with the vertical beam of the plow, a pair of bars slidably connected together, means for pivotally connecting one bar with the rear end of the landside, means for pivotally connecting the other bar with the rear part of the scraper, means for holding the bars in adjusted position, an arm on the bar which is connected with the scraper, said arm having a row of openings in its free end, a bracket connected with the scraper, a pin carried by the bracket and adapted to engage any one of the holes whereby the scraper can be tilted to various positions and a flexible member connected with the rear end of the scraper and adjustable with the handles of the plow.

In testimony whereof I affix my signature.

PHILIP D. ELLIS.